United States Patent
Lee et al.

(10) Patent No.: US 11,394,080 B2
(45) Date of Patent: Jul. 19, 2022

(54) POUCH-SHAPED BATTERY CASE COMPRISING CRACK PREVENTION STRUCTURE AND METHOD OF MANUFACTURING THE SAME

(71) Applicant: LG Chem, Ltd., Seoul (KR)

(72) Inventors: Byeong Kyu Lee, Daejeon (KR); Cha Hun Ku, Daejeon (KR); Tae Kyu Kim, Daejeon (KR)

(73) Assignee: LG Energy Solution, Ltd.

( * ) Notice: Subject to any disclaimer, the term of this patent is extended or adjusted under 35 U.S.C. 154(b) by 0 days.

(21) Appl. No.: 16/641,910

(22) PCT Filed: Jul. 13, 2018

(86) PCT No.: PCT/KR2018/007943
§ 371 (c)(1),
(2) Date: Feb. 25, 2020

(87) PCT Pub. No.: WO2019/078453
PCT Pub. Date: Apr. 25, 2019

(65) Prior Publication Data
US 2020/0185675 A1  Jun. 11, 2020

(30) Foreign Application Priority Data

Oct. 17, 2017  (KR) .................. 10-2017-0134306

(51) Int. Cl.
*H01M 50/30* (2021.01)
*H01M 10/52* (2006.01)
(Continued)

(52) U.S. Cl.
CPC ....... *H01M 50/394* (2021.01); *H01M 10/049* (2013.01); *H01M 10/0436* (2013.01);
(Continued)

(58) Field of Classification Search
CPC .. H01M 50/394; H01M 50/30; H01M 50/105; H01M 10/049; H01M 10/0436
See application file for complete search history.

(56) References Cited

U.S. PATENT DOCUMENTS

2010/0028772 A1* 2/2010 Yang ............... H01M 50/124
429/185
2010/0112436 A1  5/2010 Mizuta et al.
(Continued)

FOREIGN PATENT DOCUMENTS

CN  101904030 A  12/2010
CN  202687165 U  1/2013
(Continued)

OTHER PUBLICATIONS

Extended European Search Report including Written Opinion for Application No. EP18868686.9, dated Aug. 10, 2020, pp. 1-7.
(Continued)

*Primary Examiner* — Matthew T Martin
*Assistant Examiner* — Jessie L. Walls
(74) *Attorney, Agent, or Firm* — Lerner, David, Littenberg, Krumholz & Mentlik, LLP

(57) ABSTRACT

Disclosed are a pouch-shaped battery case including an upper case and a lower case sealed to one another, the upper case and the lower case made of a laminate sheet comprising a metal layer and a resin layer, at least one of the upper case and the lower case having a concave unit for receiving an electrode assembly, the upper case and the lower case being sealed at all corners thereof located along the outer edge of the concave unit, a middle of a first side surface of each of the upper case and the lower case having a non-sealed portion for gas discharge, the first side surface being adjacent to a second side surface of each of the upper case and the lower case through which an electrode terminal extends, a method of manufacturing the pouch-shaped battery case,
(Continued)

and a sealing block for manufacturing the pouch-shaped battery case.

4 Claims, 5 Drawing Sheets

(51) Int. Cl.
*H01M 50/105* (2021.01)
*H01M 10/04* (2006.01)
*H01M 50/548* (2021.01)
*H01M 50/124* (2021.01)

(52) U.S. Cl.
CPC ......... *H01M 10/52* (2013.01); *H01M 50/105* (2021.01); *H01M 50/124* (2021.01); *H01M 50/1245* (2021.01); *H01M 50/30* (2021.01); *H01M 50/548* (2021.01)

(56) References Cited

U.S. PATENT DOCUMENTS

| | | | |
|---|---|---|---|
| 2011/0104527 | A1 | 5/2011 | Choi et al. |
| 2011/0151292 | A1 | 6/2011 | Song |
| 2012/0258354 | A1 | 10/2012 | Yamaguchi et al. |
| 2013/0244093 | A1* | 9/2013 | Min .................. H01M 10/0585 |
| | | | 429/185 |
| 2013/0244095 | A1* | 9/2013 | Min .................... H01M 10/049 |
| | | | 429/185 |
| 2014/0205869 | A1 | 7/2014 | Mizuta et al. |
| 2015/0162574 | A1 | 6/2015 | Lim et al. |
| 2020/0185695 | A1* | 6/2020 | Kim ...................... H01M 50/73 |

FOREIGN PATENT DOCUMENTS

| | | | |
|---|---|---|---|
| CN | 103354961 | A | 10/2013 |
| CN | 104701468 | A | 6/2015 |
| CN | 105742526 | A | 7/2016 |
| EP | 2648259 | A2 | 10/2013 |
| JP | 2005093261 | A | 4/2005 |
| JP | 2006147230 | A | 6/2006 |
| JP | 2006332009 | A | 12/2006 |
| JP | 2007265879 | A | 10/2007 |
| JP | 2009123930 | A | 6/2009 |
| JP | 2010049913 | A | 3/2010 |
| JP | 2011507183 | A | 3/2011 |
| JP | 2011138636 | A | 7/2011 |
| JP | 2014502025 | A | 1/2014 |
| JP | 2014032924 | A | 2/2014 |
| JP | 2015165557 | A | 9/2015 |
| JP | 2016122495 | A | 7/2016 |
| JP | 2017157445 | A | 9/2017 |
| KR | 20080034223 | A | 4/2008 |
| KR | 101159099 | B1 | 6/2012 |
| KR | 20140046174 | A | 4/2014 |
| KR | 20140055641 | A | 5/2014 |
| KR | 20140067246 | A | 6/2014 |
| KR | 20160100602 | A | 8/2016 |
| KR | 20160111614 | A | 9/2016 |
| KR | 101726783 | B1 | 4/2017 |
| KR | 20170068332 | A | 6/2017 |
| WO | 2008102571 | A1 | 8/2008 |

OTHER PUBLICATIONS

International Search Report for Application No. PCT/KR2018/007943, dated Feb. 26, 2019, pp. 1-3.
Search Report from Chinese Application No. 201880054447.3 dated Dec. 1, 2021. 3 pgs.
Search Report dated Apr. 22, 2022 from Office Action for Chinese Application No. 201880054447.3 dated May 6, 2022. 2 pgs.

* cited by examiner

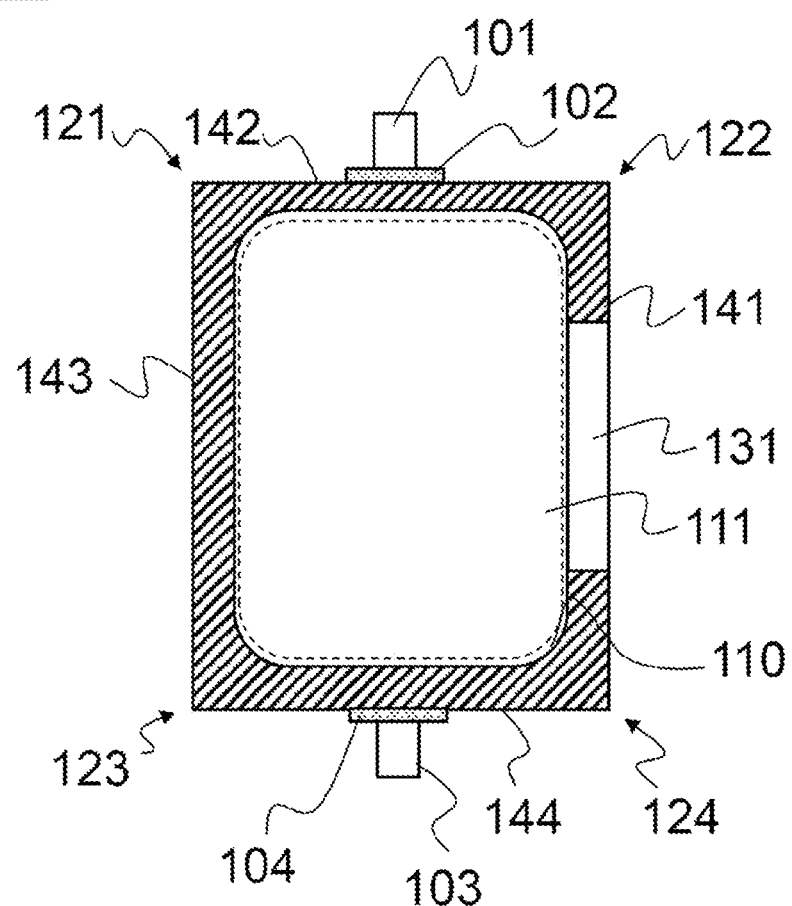
[FIG. 1]

[FIG. 2]
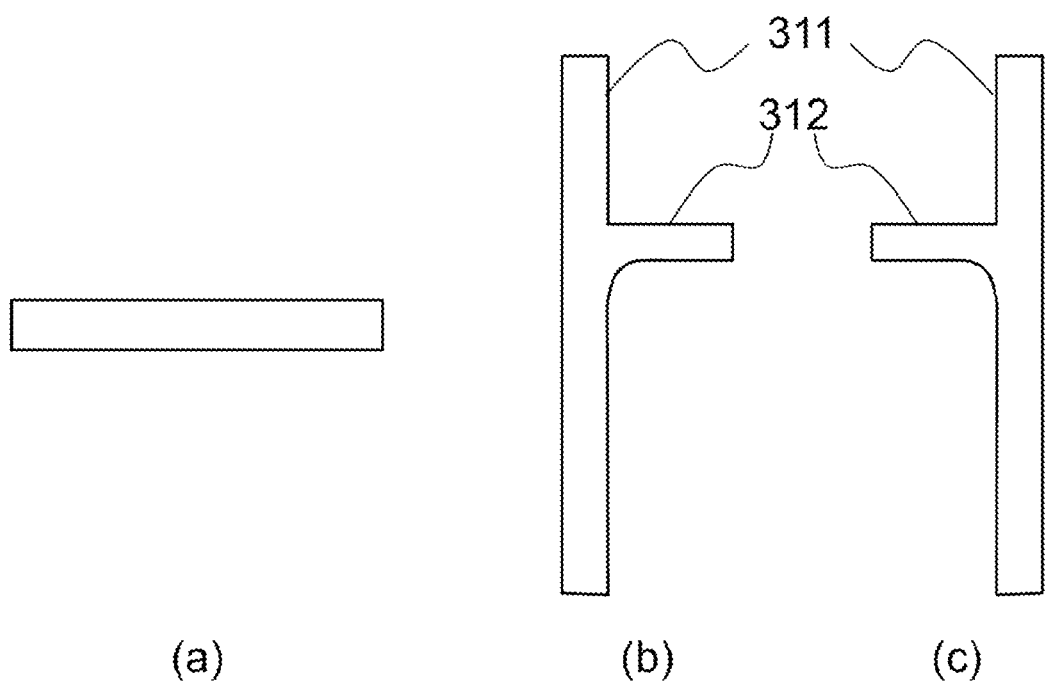

[FIG. 3]
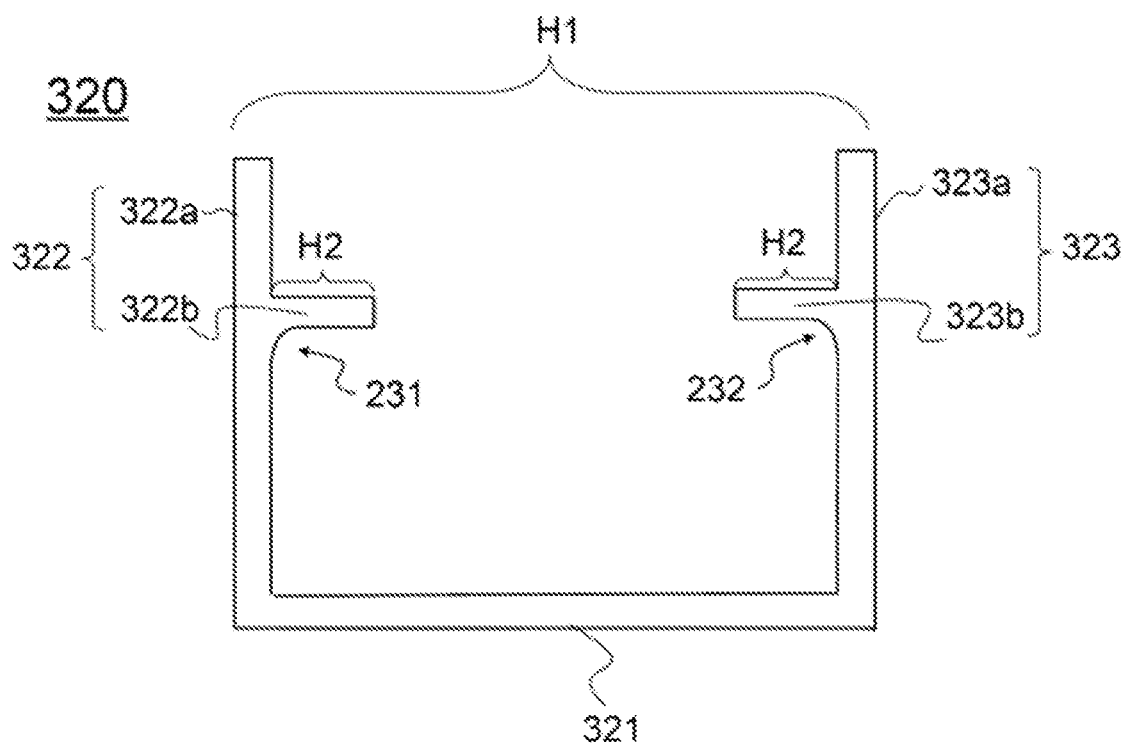

[FIG. 4]
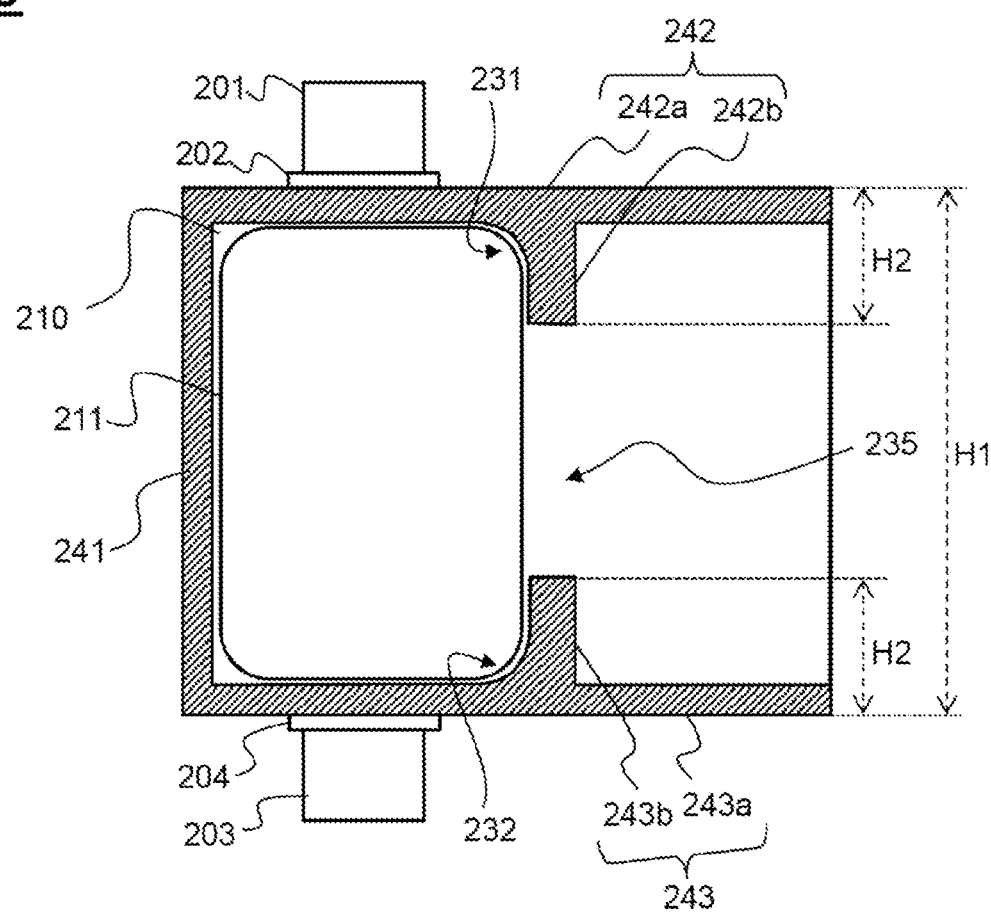

[FIG. 5]
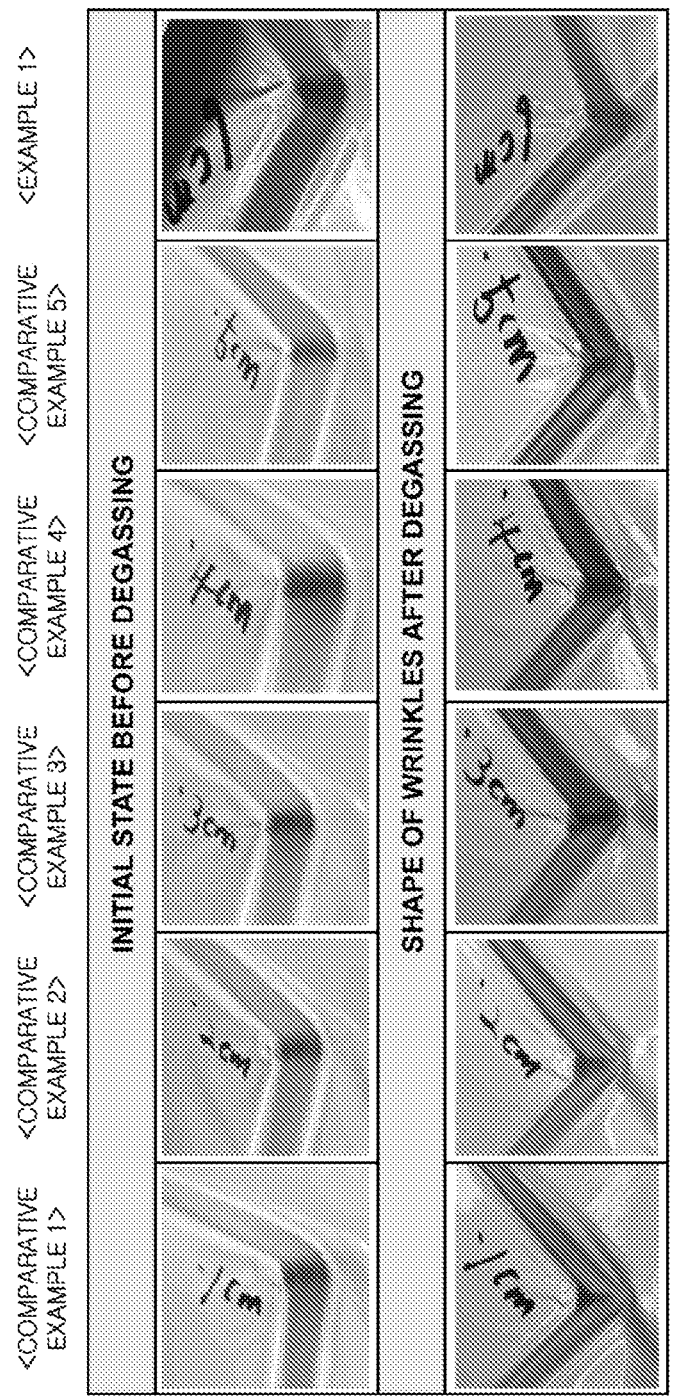

POUCH-SHAPED BATTERY CASE COMPRISING CRACK PREVENTION STRUCTURE AND METHOD OF MANUFACTURING THE SAME

CROSS-REFERENCE TO RELATED APPLICATIONS

This application is a national phase entry under 35 U.S.C. § 371 of International Patent Application No. PCT/KR2018/007943, filed on Jul. 13, 2018, published in Korean, which claims priority from Korean Patent Application No. 2017-0134306, filed on Oct. 17, 2017, the disclosures of which are hereby incorporated herein by reference in their entireties.

TECHNICAL FIELD

The present invention relates to a pouch-shaped battery case including a crack prevention structure, and more particularly to a pouch-shaped battery case configured to have a structure in which at least one of an upper case and a lower case, which are separate from each other, is provided therein with a concave unit for receiving an electrode assembly, in which sealed portions are formed at all corners of the outer edge of the concave unit, and in which a non-sealed portion for gas discharge is provided in the middle of a first side surface that is connected to the side surface of the battery case at which an electrode terminal is located.

BACKGROUND ART

Lithium secondary batteries may be classified into a cylindrical battery, a prismatic battery, and a pouch-shaped battery based on the shape of a battery case. Each of the cylindrical battery and the prismatic battery is a battery that is configured to have a structure in which an electrode assembly is mounted in a metal can. The pouch-shaped battery is a battery that is generally configured to have a structure in which an electrode assembly is mounted in a pouch-shaped battery case made of an aluminum laminate sheet. Among these battery cells, the pouch-shaped battery, which can be stacked with high integration, has high energy density per unit weight, is inexpensive, and can be easily modified, has attracted considerable attention in recent years.

The pouch-shaped battery may include two separable battery cases or a single battery case made of a laminate sheet, which is configured to be bent.

As the demand for high-capacity, high-efficiency secondary batteries has increased in recent years, a battery case configured to have a structure in which an electrode assembly reception unit is formed in each of upper and lower cases that are separated from each other in order to receive a thick electrode assembly has been used.

When the battery case including the upper and lower cases that are separated from each other is sealed, a non-sealed portion for gas discharge is formed in the battery case, and gas is discharged from the battery case and an electrolytic solution is introduced into the battery case through the non-sealed portion.

When manufacturing a secondary battery, charging, discharging, and degassing processes are performed repeatedly. When the degassing process is performed in a vacuum decompression state, stress is concentrated on the corners of a concave unit for receiving the electrode assembly formed in the battery case. As a result, the portions of the battery case in the vicinity of the corners of the concave unit become distorted and warped, whereby wrinkles are formed in the battery case.

As the result of repetitive vacuum decompression and expansion, the corresponding portions of the battery case become torn due to the wrinkles, thus serving as seeds starting at which openings may be formed in the battery case. Consequently, the battery case becomes defective.

When the battery case is sealed, therefore, a sealing block that is generally formed in the shape of an alphabet letter r is used to prevent wrinkles from being formed in the vicinity of the corners of a concave unit of the battery case; in this case, however, the above-mentioned problem cannot be completely solved.

In connection therewith, Patent Document 1 discloses a process of forming a non-sealed portion in a portion of the outer edge of an electrode assembly reception unit at the time of manufacturing a battery cell to provide a gas pocket, and Patent Document 2 discloses a pouch-shaped battery case having a surplus portion for gas collection formed at one side of a sealed portion provided at the outer edge of a reception unit for receiving an electrode assembly. However, these patents do not suggest technology for preventing wrinkles from being formed at the corners of the electrode assembly reception unit.

Therefore, there is an urgent necessity for technology that is capable of preventing wrinkles from being formed at the corners of a concave unit for receiving an electrode assembly at the time of manufacturing a pouch-shaped battery.

Korean Registered Patent No. 1726783
Korean Registered Patent No. 1159099

DISCLOSURE

Technical Problem

The present invention has been made in view of the above problems and other technical problems that have yet to be resolved, and it is an object of the present invention to provide a pouch-shaped battery case configured to have a structure in which all corners of the outer edge of a concave unit for receiving an electrode assembly are sealed and in which a non-sealed portion for gas discharge is provided in the middle of one side of the outer edge of the concave unit, whereby wrinkles are prevented from being formed at the corners of the outer edge of the concave unit.

It is another object of the present invention to provide a battery case manufactured using a sealing block, which is configured to have an open structure that is capable of sealing corners in the vicinity of a concave unit for receiving an electrode assembly and not sealing a portion of the side sealed portions, whereby it is possible to prevent wrinkles from being formed at the corners of the battery case, and a method of manufacturing the same.

Technical Solution

In accordance with an aspect of the present invention, the above and other objects can be accomplished by the provision of a pouch-shaped battery including an upper case and a lower case sealed to one another, each of the upper case and the lower case made of a laminate sheet comprising a metal layer and a resin layer, at least one of the upper case and the lower case having a concave unit formed therein for receiving an electrode assembly, the upper case and the lower case being sealed to one another at all corners thereof located along the outer edge of the concave unit, a middle of a first side surface of each of the upper case and the lower case having a non-sealed portion for gas discharge, the first side surface being adjacent to a second side surface of each of the upper case and the lower case through which an electrode terminal extends.

As the demand for high-output, high-capacity secondary batteries has increased, the thickness of the electrode assembly has been increased, and the depth of the concave unit for receiving the electrode assembly has also been increased in order to receive the thickened electrode assembly. In consideration of the properties of the battery case, which is made of a laminate sheet including a resin layer and a metal layer, the thickness of the battery case may be increased in order to form a deeply concave unit, which is undesirable. For this reason, a concave unit for receiving the electrode assembly is formed in each of the upper case and the lower case, whereby it is possible to receive a thick electrode assembly. The battery case having the above structure may be used as a battery case for high-capacity secondary batteries.

The electrode assembly may be a jelly-roll type (wound type) electrode assembly, which is configured to have a structure in which long sheet type positive electrodes and long sheet type negative electrodes are wound in the state in which separators are interposed respectively between the positive electrodes and the negative electrodes, a stacked type electrode assembly, which is configured to have a structure in which a plurality of positive electrodes cut so as to have a predetermined size and a plurality of negative electrodes cut so as to have a predetermined size are sequentially stacked in the state in which separators are interposed respectively between the positive electrodes and the negative electrodes, a stacked/folded type electrode assembly, which is configured to have a structure in which bi-cells or full cells, each of which is configured to have a structure in which predetermined numbers of positive electrodes and negative electrodes are stacked in the state in which separators are disposed respectively between the positive electrodes and the negative electrodes, are wound using a separation sheet, or a laminated/stacked type electrode assembly, which is configured to have a structure in which bi-cells or full cells are stacked and laminated in the state in which separators are disposed respectively between the bi-cells or the full cells.

The stacked type electrode assembly, the stacked/folded type electrode assembly, and the laminated/stacked type electrode assembly may be configured to have a structure in which positive electrode tabs and negative electrode tabs protrude in opposite directions, or may be configured to have a structure in which positive electrode tabs and negative electrode tabs protrude in the same direction. In the case in which a high-capacity secondary battery is manufactured, an electrode assembly configured to have a structure in which positive electrode tabs and negative electrode tabs protrude in opposite directions may be used for achieving easy connection to an external device.

During the manufacture of the pouch-shaped battery case, the other sides of the outer edge of the battery case excluding one side of the outer edge of the battery case are sealed, and charging, discharging, and degassing processes for activating the battery are performed several times in order to place the electrode assembly in the battery case, to discharge gas from the battery case, and to inject an electrolytic solution into the battery case. At this time, the battery case is distorted and warped as the result of vacuum decompression of the battery case in order to discharge gas from the battery case, whereby wrinkles are formed in the battery case.

In particular, since the corners of the concave unit, in which the electrode assembly is mounted, are stretched in order to form the concave unit, the thickness of the corners of the concave unit is smaller than the thickness of other portions of the concave unit. As a result, wrinkles may be easily formed at the corners of the concave unit when the battery case undergoes the vacuum decompression process.

In the case in which all the corners of the outer edge of the concave unit are fully sealed and the non-sealed portion for gas discharge is formed in the middle of one side of the outer edge of the concave unit, rather than the corners of the outer edge of the concave unit, before the degassing process is performed on the battery, as in the present invention, therefore, it is possible to prevent wrinkles from being formed at the corners of the outer edge of the concave unit.

That is, the remaining portions of the outer edge of the concave unit excluding the non-sealed portion for gas discharge may be sealed. Since the remaining portions of the outer edge of the concave unit excluding the non-sealed portion for gas discharge are sealed before the degassing process is performed in order to discharge gas from the battery case, therefore, it is possible to minimize the deformation of the battery case. Consequently, it is possible to remarkably reduce a battery case defect rate.

In a concrete example, the first side surface may be provided in the middle thereof with a non-sealed region, and may be provided at opposite ends thereof with sealed portions. The length of each sealed portion at the first side surface may be 35% or more of the overall length of the first side surface.

The sealed portions may be formed at the opposite ends of the first side surface so as to have the same length. In the case in which the length of each sealed portion at the first side surface is less than 35% of the overall length of the first side surface, it is difficult to prevent wrinkles from being formed at the corners, which is undesirable. However, the non-sealed portion may be formed so as to be 50% or more of the overall length of the first side surface in order to provide a sufficient path to discharge gas.

In a concrete example, a positive electrode terminal (or a negative electrode terminal) and a negative electrode terminal (or positive electrode terminal) may be located at a second side surface or a fourth side surface that is adjacent to the first side surface, and a sealed portion formed at the corner at which the first side surface and the second side surface are connected to each other and a sealed portion formed at the corner at which the first side surface and the fourth side surface are connected to each other may be located so as to abut the concave unit.

In the case in which the sealed portion formed at the corner at which the first side surface and the second side surface are connected to each other and the sealed portion formed at the corner at which the first side surface and the fourth side surface are connected to each other are located so as to be spaced apart from the concave unit, the concave unit may easily deformed, whereby wrinkles may be easily formed, since the non-sealing portion is formed in the outer edge of the concave unit, which is undesirable.

In accordance with another aspect of the present invention, there is provided a sealing block for manufacturing the pouch-shaped battery case, the sealing block including a first block for sealing the outer edge of the concave unit that is opposite from the first side surface, and a second block and a third block coupled perpendicularly to the first block at opposite ends of the first block, each of the second block and the third block including a linear portion configured to be parallel to the outer edge of an electrode assembly from which the electrode terminal protrudes, and a crack prevention portion extending perpendicularly from the linear portion, wherein a length of each crack prevention portion is 18% or more of an overall length of the battery case in the longitudinal direction thereof.

That is, the sealing block may be configured to have a structure in which the middle of one side of the outer edge of the pouch-shaped battery case is not sealed and the remaining sides of the outer edge of the pouch-shaped battery case are sealed.

The first block may be separated from the second block and the third block. The first block, which is located at the position corresponding to the major-axis direction of the pouch-shaped battery case, may be replaced depending on the major-axis length of a pouch-shaped battery case to be sealed.

Each of the second block and the third block, each of which includes the linear portion and the crack prevention portion, may be formed in the shape of an alphabet letter r when viewed in a plan view. Generally, in the structure in which the electrode tabs protrude from the electrode assembly in different directions, opposite sides of the electrode assembly are symmetrical with respect to the middle axis of the electrode assembly that is perpendicular to the direction in which the electrode tabs protrude. In consideration thereof, therefore, the second block and the third block may be symmetrical with each other and may have the same size.

In a concrete example, the first block may be formed integrally with the second block and the third block. In this case, it is possible to reduce the time necessary to position the sealing block for sealing, since an integrated sealing block is used.

The surface of the crack prevention portion that faces a concave unit for receiving the electrode assembly may be provided with a round structure having a radius of curvature corresponding to a corner of the concave unit.

In the case in which the sealing block is located so as to be adjacent to the concave unit for receiving the electrode assembly, sealed portions may be formed at the outer edge of the concave unit, whereby it is possible to prevent wrinkles from being formed at the battery case. Preferably, the side surface of the crack prevention portion that faces the concave unit is located so as to be adjacent to the outer edge of the concave unit.

In addition, the crack prevention portion may be rounded so as to correspond to the shape of a corner of the concave unit. Specifically, in the case in which the radius of curvature of the crack prevention portion corresponds to the radius of curvature of the corner of the concave unit, the crack prevention portion is the same size and shape as the corner of the concave unit. Consequently, the sealing portions may be formed at the outer edge of the concave unit that is adjacent to the corner of the concave unit, whereby it is possible to maximally prevent wrinkles from being formed at the battery case.

The crack prevention portions may extend in the direction in which the second block and the third block face each other such that the sealed portions are formed inwards from the opposite ends of the outer edge of the battery case in the longitudinal direction thereof. In the case in which the length of each crack prevention portion is less than 18% of the overall length of the battery case in the longitudinal direction thereof, the length of each sealed portion may be reduced, whereby wrinkles may be formed at the battery case, which is undesirable. In addition, the non-sealed portion may be formed so as to be 50% or more of the overall length of the battery case in the longitudinal direction thereof in order to provide a sufficient path to discharge gas.

In accordance with another aspect of the present invention, there is provided a method of sealing the pouch-shaped battery case.

Specifically, a method of sealing a pouch-shaped battery case may include (a) placing an upper case and a lower case adjacent to one another, in which an electrode assembly is received, the electrode assembly having positive electrode tabs and negative electrode tabs protruding in different directions, portions of the upper case and the lower case facing each other, (b) placing a sealing block along all outer edges of the upper case and the lower case in the directions in which the positive electrode tabs and the negative electrode tabs protrude, along an entire second one of the outer edges in a direction opposite the direction in which a gas is discharged, and at opposite ends of a first one of the outer edges in the direction in which the gas is discharged, and (c) pressing and/or heating the sealing block to seal the upper case and the lower case to one another, wherein the length of the sealing block located at one end of the first one of the outer edges is 18% or more of the overall length of the first one of the outer edges, the first one of the outer edges having a non-sealed portion configured to receive a discharge of the gas therethrough.

That is, in the state in which the sealing block, which is configured to have a structure that is capable of sealing the outer edge of a concave unit for receiving the electrode assembly in the directions in which the positive electrode tabs and negative electrode tabs protrude and in a direction opposite the direction in which gas is discharged and not sealing the middle of the outer edge of the concave unit in the direction in which gas is discharged, is located at the outer edge of the concave unit, the sealing block may be pressed and/or heated in order to seal the pouch-shaped battery case.

In the case in which the length of the sealing block located at one end of the outer edge in the direction in which gas is discharged is less than 18% of the overall length of the outer edge in the direction in which gas is discharged, the length of each sealed portion may be reduced, whereby wrinkles may be formed at the battery case, which is undesirable. In addition, the non-sealed portion may be formed so as to be 50% or more of the overall length of the battery case in the longitudinal direction thereof in order to provide a sufficient path to discharge gas.

At step (b), the sealing block may be located so as to be adjacent to the outer edge of the concave unit for receiving the electrode assembly. In the case in which the sealing block is located so as to be adjacent to the outer edge of the concave unit, sealed portions may be formed at the outer edge of the concave unit, whereby it is possible to further prevent wrinkles from being formed at the battery case.

The method may further include (d) discharging gas after step (c), i.e. after the battery case is sealed. Specifically, the step of discharging gas may be performed after an electrolytic solution injection step and an initial charging and discharging step, and the charging and discharging step and the gas discharging step may be repeatedly performed several times.

In accordance with other aspects of the present invention, there are provided a secondary battery including the pouch-shaped battery case and a battery pack including the secondary battery.

The battery pack may be used as a power source for a device requiring the ability to withstand high temperatures, a long lifespan, high rate characteristics, etc. Specific examples of the device may include a mobile electronic device, a wearable electronic device, a power tool driven by a battery-powered motor, an electric automobile, such as an electric vehicle (EV), a hybrid electric vehicle (HEV), or a plug-in hybrid electric vehicle (PHEV), an electric two-wheeled vehicle, such as an electric bicycle (E-bike) or an electric scooter (E-scooter), an electric golf cart, and an energy storage system. However, the present invention is not limited thereto.

The structure and manufacturing method of the device are well known in the art to which the present invention pertains, and thus a detailed description thereof will be omitted.

BRIEF DESCRIPTION OF DRAWINGS

FIG. 1 is a plan view showing a pouch-shaped battery case according to an embodiment of the present invention.

FIG. 2 is a plan view showing a sealing block according to an embodiment of the present invention.

FIG. 3 is a plan view showing a sealing block according to another embodiment of the present invention.

FIG. 4 is a plan view showing a pouch-shaped battery case, to which a sealing block according to an embodiment of the present invention is applied.

FIG. 5 illustrates perspective views of exemplary corners of battery cases before and after a degassing process is conducted.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

Wherever possible, the same reference numbers will be used throughout the drawings to refer to parts that perform similar functions or operations. Meanwhile, in the case in which one part is 'connected' to another part in the following description of the present invention, not only may the one part be directly connected to the another part, but also, the one part may be indirectly connected to the another part via a further part. In addition, that a certain element is 'included' means that other elements are not excluded, but may be further included unless mentioned otherwise.

Reference will now be made in detail to the preferred embodiments of the present invention, examples of which are illustrated in the accompanying drawings.

FIG. 1 is a plan view schematically showing a pouch-shaped battery case according to an embodiment of the present invention.

Referring to FIG. 1, the pouch-shaped battery case, denoted by reference numeral 100, is provided in the middle thereof with a concave unit 110 for receiving an electrode assembly, in which an electrode assembly 111 is received. A positive electrode terminal 101 protrudes from the upper part of the electrode assembly 111, and a negative electrode terminal 103 protrudes from the lower part of the electrode assembly 111. The positive electrode terminal 101 and the negative electrode terminal 103 are thermally fused to the battery case in the state in which lead films 102 are attached to the upper and lower surface of the positive electrode terminal 101, and lead films 104 are attached to the upper and lower surface of the negative electrode terminal 10 such that the battery case is sealed.

Four corners 121, 122, 123, and 124 of the battery case, which are located at the outer edge of the concave unit 110, are sealed. In addition, an upper sealed portion 142, a lower sealed portion 144, and a left sealed portion 143 of the battery case are entirely sealed. Opposite ends of a right sealed portion 141 of the battery case, which are located at the corners 122 and 124, are sealed, but a non-sealed portion 131 is formed in the middle of the right sealed portion 141. Gas is discharged from the battery case through the non-sealed portion 131.

FIG. 2 is a plan view schematically showing a sealing block according to an embodiment of the present invention.

Referring to FIG. 2, the sealing block, denoted by reference numeral 310, includes a first block a, a second block b, and a third block c. The first block a, the second block b, and the third block c, which constitute the sealing block 310, are separated from each other.

The first block a is configured to seal the portion of the outer edge of a battery case that is opposite the direction in which gas is discharged. The first block is linear when viewed in a plan view. The first block has a shape that is generally similar to a rectangular parallelepiped. The first block a has a length corresponding to the length of the battery case to be sealed. The first block may be selectively applied.

The second block b and the third block c are the same size, and are mirror-symmetrically arranged. Each of the second block and the third block includes a linear portion 311 that contacts the linear first block a so as to be perpendicular to the first block a at a corresponding one of the opposite ends of the first block a and a crack prevention portion 312 extending from the middle of the linear portion 311 so as to protrude perpendicularly from the linear portion 311. The crack prevention portions 312 of the second block b and the third block face each other.

Each of the second block b and the third block c is configured to have a structure in which one corner of the connection between the linear portion 311 and the crack prevention portion 312 is round. Specifically, a round structure is formed at the corner that faces the direction in which a concave unit for receiving an electrode assembly is formed.

In addition, each of the second block b and the third block c is configured to have a structure in which the other corner of the connection between the linear portion 311 and the crack prevention portion 312 is right-angled.

FIG. 3 is a plan view schematically showing a sealing block according to another embodiment of the present invention.

Referring to FIG. 3, the sealing block, denoted by reference numeral 320, is generally formed in a U shape, and includes a first block 321, located at the lower middle part thereof, and a second block 322 and a third block 323, extending perpendicularly from opposite ends of the first block 321 in one direction.

The first block 321, the second block 322, and the third block 323 are connected to each other.

The second block 322 has the same shape as the second block b of FIG. 2, and the third block 323 has the same shape as the third block c of FIG. 2. The second block 322 includes a linear portion 322a and a crack prevention portion 322b extending perpendicularly from the linear portion 322a, and the third block 323 includes a linear portion 323a and a crack prevention portion 323b extending perpendicularly from the linear portion 323a.

The structure of the second block 322 and the third block 323 is identical to the structure of the second block b and the third block c of FIG. 2, and therefore a description of the second block 322 and the third block 32 will be omitted.

FIG. 4 is a plan view schematically showing a pouch-shaped battery case, to which a sealing block according to an embodiment of the present invention is applied.

Referring to FIG. 4, the battery case, denoted by reference numeral 200, is provided with a concave unit 210 for receiving an electrode assembly, and an electrode assembly 211 is received in the concave unit 210. The battery case is sealed in the state in which a positive electrode terminal 201 protruding upwards from the electrode assembly 211 and a negative electrode terminal 201 protruding downwards from the electrode assembly 211 are attached to the outer edge of the battery case via lead films 202 and 204.

The sealing block is located at the outer edge of the concave unit 210. The sealing block includes a first block 241, located at the portion of the outer edge of the concave unit that is opposite a gas discharge portion 235, and a second block 242 and a third block 243, located at the portions of the outer edge of the concave unit in the direction in which electrode terminals protrude. The second block 242 includes a linear portion 242a and a crack prevention portion 242b, and the third block 243 includes a linear portion 243a and a crack prevention portion 243b.

Corners 231 and 232 of the crack prevention portion 242b of the second block 242 and the crack prevention portion 243b of the third block 243 that face the concave unit 210 are rounded, and are located adjacent to the concave unit for receiving the electrode assembly.

The length H2 of the crack prevention portion 242b of the second block 242 and the length H2 of the crack prevention portion 243b of the third block 243 are the same. The length H2 of each crack prevention portion is 18% or more of the overall length H1 of the battery case in the longitudinal direction thereof.

Hereinafter, the present invention will be described with reference to the following example. This example is provided only for illustration of the present invention and should not be construed as limiting the scope of the present invention.

Example 1

An upper case and a lower case, in each of which a concave unit for receiving an electrode assembly was formed, were prepared, and the upper case and the lower case were arranged such that the outer edges thereof were aligned with each other.

The length of each of the upper case and the lower case in the longitudinal direction thereof was 320 mm.

The other three portions of the outer edge of each of the upper case and the lower case, including all outer-edge corners of the concave unit, were sealed, excluding one portion of the outer edge of each of the upper case and the lower case, in which a non-sealed portion for gas discharge was formed.

The non-sealed portion for gas discharge was formed in the middle of the portion of the outer edge of each of the upper case and the lower case in which the non-sealed portion was formed. The portion of the outer edge of each of the upper case and the lower case in which the non-sealed portion was formed was sealed such that sealed portions each having a length of 60 mm were formed at opposite ends thereof so as to extend inwards.

A battery case manufactured as described above was placed in a vacuum chamber, and a vacuum decompression process and a normal-pressure compression process were performed in order to degas the battery case.

The states of the corners of the battery case before and after the degassing process are shown in FIG. 5.

Comparative Example 1

A battery case was manufactured in the same manner as in Example 1, except that the portion of the outer edge of the battery case in which a non-sealed portion for gas discharge was formed was sealed such that sealed portions each having a length of 10 mm were formed at opposite ends thereof so as to extend inwards. A degassing process was performed on the manufactured battery case. The states of the corners of the battery case before and after the degassing process are shown in FIG. 5.

Comparative Example 2

A battery case was manufactured in the same manner as in Example 1, except that the portion of the outer edge of the battery case in which a non-sealed portion for gas discharge was formed was sealed such that sealed portions each having a length of 20 mm were formed at opposite ends thereof so as to extend inwards. A degassing process was performed on the manufactured battery case. The states of the corners of the battery case before and after the degassing process are shown in FIG. 5.

Comparative Example 3

A battery case was manufactured in the same manner as in Example 1, except that the portion of the outer edge of the battery case in which a non-sealed portion for gas discharge was formed was sealed such that sealed portions each having a length of 30 mm were formed at opposite ends thereof so as to extend inwards. A degassing process was performed on the manufactured battery case. The states of the corners of the battery case before and after the degassing process are shown in FIG. 5.

Comparative Example 4

A battery case was manufactured in the same manner as in Example 1, except that the portion of the outer edge of the battery case in which a non-sealed portion for gas discharge was formed was sealed such that sealed portions each having a length of 40 mm were formed at opposite ends thereof so as to extend inwards. A degassing process was performed on the manufactured battery case. The states of the corners of the battery case before and after the degassing process are shown in FIG. 5.

Comparative Example 5

A battery case was manufactured in the same manner as in Example 1, except that the portion of the outer edge of the battery case in which a non-sealed portion for gas discharge was formed was sealed such that sealed portions each having a length of 50 mm were formed at opposite ends thereof so as to extend inwards. A degassing process was performed on the manufactured battery case. The states of the corners of the battery case before and after the degassing process are shown in FIG. 5.

Referring to FIG. 5, it can be seen that the depth-directional sidewall of a concave unit of each of the battery cases manufactured according to Comparative Examples 1 to 5 was bent inwards after the degassing process, whereas the depth-directional sidewall of a concave unit of the battery case manufactured according to Example 1 was not bent inwards but remained flat after the degassing process.

When the sealing portions are formed at the corners of the concave unit for receiving the electrode assembly so as to have a length of at least 60 mm each in the case in which the length of the battery case is 320 mm in the longitudinal direction thereof, as in the pouch-shaped battery case according to the present invention, as described above, it is possible to prevent the corners of the battery case from being deformed and thus prevent wrinkles from being formed at the battery case. Consequently, it is possible to reduce a defect rate.

Those skilled in the art to which the present invention pertains will appreciate that various applications and modifications are possible based on the above description, without departing from the scope of the present invention.

- 100, 200: Pouch-shaped battery cases
- 101, 103, 201, 203: Electrode terminals
- 102, 104, 202, 204: Lead films
- 110, 210: Concave units for receiving electrode assembly
- 111, 211: Electrode assemblies
- 121, 122, 123, 124: Outer-edge corners of concave units for receiving electrode assembly
- 131: Non-sealed portion
- 141: Right sealed portion (first side surface)
- 142: Upper sealed portion (second side surface)
- 143: Left sealed portion (third side surface)
- 144: Lower sealed portion (fourth side surface)
- 231: Corner of second block
- 232: Corner of third block
- 235: Gas discharge portion
- 241, (a), 321: First blocks
- 242, (b), 322: Second blocks
- 243, (c), 323: Third blocks
- 242a, 243a, 311, 322a, 323a: Linear portions
- 242b, 243b, 312, 322b, 323b: Crack prevention portions
- 310, 320: Sealing blocks
- H1: Overall length of battery case in longitudinal direction
- H2: Length of crack prevention portion

INDUSTRIAL APPLICABILITY

As is apparent from the above description, in a pouch-shaped battery case according to the present invention and a method of manufacturing the same, all corners of the outer edge of a concave unit for receiving an electrode assembly are sealed, and a non-sealed portion for gas discharge is formed in the middle of one side of the outer edge of the concave unit. Consequently, it is possible to prevent stress from being concentrated on the corners of the concave unit and thus to prevent wrinkles from being formed at corners of the concave unit when vacuum decompression is repeatedly performed in order to discharge gas from the battery case.

In addition, the present invention provides a sealing block having a shape corresponding to the sealed portions described above. Consequently, it is possible to easily reduce a battery case defect rate through a single sealing process.

The invention claimed is:

1. A method of sealing a pouch-shaped battery case, the method comprising:
   (a) placing an upper case and a lower case adjacent to one another, in which an electrode assembly is received, the electrode assembly having positive electrode tabs and negative electrode tabs protruding in different directions, portions of the upper case and the lower case facing each other;
   (b) placing a sealing block along first and second opposite outer edges of the upper case and the lower case in the directions in which the positive electrode tabs and the negative electrode tabs protrude, along an entire third outer edge disposed in a direction opposite a direction in which a gas is discharged, and at opposite ends of a fourth outer edge disposed in the direction in which the gas is discharged, the fourth outer edge being opposite from the third outer edge;
   (c) pressing and/or heating the sealing block to seal the upper case and the lower case to one another, wherein a length of the sealing block located at one end of the of the fourth outer edge is 18% or more of an overall length of the fourth outer edge, the fourth outer edge having a non-sealed portion configured to receive a discharge of the gas therethrough, the non-sealed portion being a portion of the fourth outer edge at which the upper case and the lower case are not sealed to one another, a length of the non-sealed portion being 50% or more of the overall length of the fourth outer edge.

2. The method according to claim 1, wherein, during step (b), the sealing block is adjacent to an outer edge of a concave unit formed in the upper case and the lower case for receiving the electrode assembly.

3. The method according to claim 1, further comprising (d) discharging the gas through the non-sealed portion after step (c).

4. The method according to claim 1, further comprising:
   (d) injecting an electrolytic solution into the battery case; and
   (e) charging, discharging, and degassing the electrode assembly several times, the degassing including discharging the gas from the battery case through the non-sealed portion.

* * * * *